US011588348B1

(12) United States Patent
Krenz

(10) Patent No.: US 11,588,348 B1
(45) Date of Patent: Feb. 21, 2023

(54) AIRCRAFT SEAT POWER VIA INDUCTIVE COUPLING

(71) Applicant: B/E Aerospace, Inc., Winston-Salem, NC (US)

(72) Inventor: Michael J. Krenz, Roscoe, IL (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/579,704

(22) Filed: Jan. 20, 2022

(51) Int. Cl.
*H02J 50/10* (2016.01)
*B64D 11/06* (2006.01)

(52) U.S. Cl.
CPC ............. *H02J 50/10* (2016.02); *B64D 11/06* (2013.01); *B64D 2221/00* (2013.01)

(58) Field of Classification Search
CPC ....... H02J 50/10; B64D 11/06; B64D 2221/00
USPC ......................................................... 307/9.1
See application file for complete search history.

(56) References Cited

U.S. PATENT DOCUMENTS

| 8,164,215 B2 | 4/2012 | Bauer et al. |
| 9,211,953 B2 | 12/2015 | Paul |
| 9,318,922 B2 | 4/2016 | Hall et al. |
| 9,840,330 B2 | 12/2017 | Dueser |
| 9,862,338 B2 | 1/2018 | Bauer et al. |
| 10,135,285 B2 | 11/2018 | Ayotte |
| 10,468,914 B2 | 11/2019 | Lee et al. |
| 2006/0202665 A1* | 9/2006 | Hsu .................. H02J 7/0042 320/139 |
| 2009/0295223 A1* | 12/2009 | Bauer ................ H04L 25/02 307/9.1 |
| 2010/0285747 A1* | 11/2010 | Bauer ................ H01F 38/14 307/104 |
| 2013/0167817 A1 | 7/2013 | Bauer et al. |
| 2021/0061134 A1 | 3/2021 | Sjostrom et al. |

FOREIGN PATENT DOCUMENTS

| EP | 2733012 B1 | 11/2014 |
| WO | 2020189260 A1 | 9/2020 |

* cited by examiner

*Primary Examiner* — Alfonso Perez Borroto
(74) *Attorney, Agent, or Firm* — Suiter Swantz pc llo

(57) ABSTRACT

A wireless power delivery system for aircraft seats includes an NFC power receiving device disposed at a known location proximal to floor rail bracket engaging portion of the seat, and an NFC power delivery device engages a corresponding bracket disposed underneath the aircraft floor. The brackets are aligned to each other to ensure the disposition of the NFC power delivery device is sufficiently close to the NFC power receiving device to effectively transfer power. The NFC power delivery device is disposed in a cargo container. Bracket engaging elements in the seat rows include features that indicate a location on a lower bracket to align the NFC power receiving device to the NFC power delivery device.

20 Claims, 4 Drawing Sheets

AIRCRAFT SEAT POWER VIA INDUCTIVE COUPLING

BACKGROUND

Delivering power to aircraft seats currently involves running wires throughout the aircraft cabin to each seat row. Such wires are a safety hazard because they can be accessed by passengers, and the wires add substantial weights and can interfere with the installation and removal of the seats when needed for maintenance, cleaning, etc. It would be advantageous to have a system for delivery power to aircraft seats that was reliable, secure, and unencumbering.

SUMMARY

In one aspect, embodiments of the inventive concepts disclosed herein are directed to a wireless power delivery system for aircraft seats. Each seat row includes a near field communication ("NFC") power receiving device disposed at a known location proximal to floor rail bracket engaging portion of the seat. Likewise, the NFC power delivery device engages a corresponding bracket disposed underneath the aircraft floor. The brackets are aligned to each other to ensure the disposition of the NFC power delivery device is sufficiently close to the NFC power receiving device to effectively transfer power.

In a further aspect, the NFC power delivery device is disposed in a cargo container.

In a further aspect, bracket engaging elements in the seat rows include features that indicate a location on a lower bracket to align the NFC power receiving device to the NFC power delivery device.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
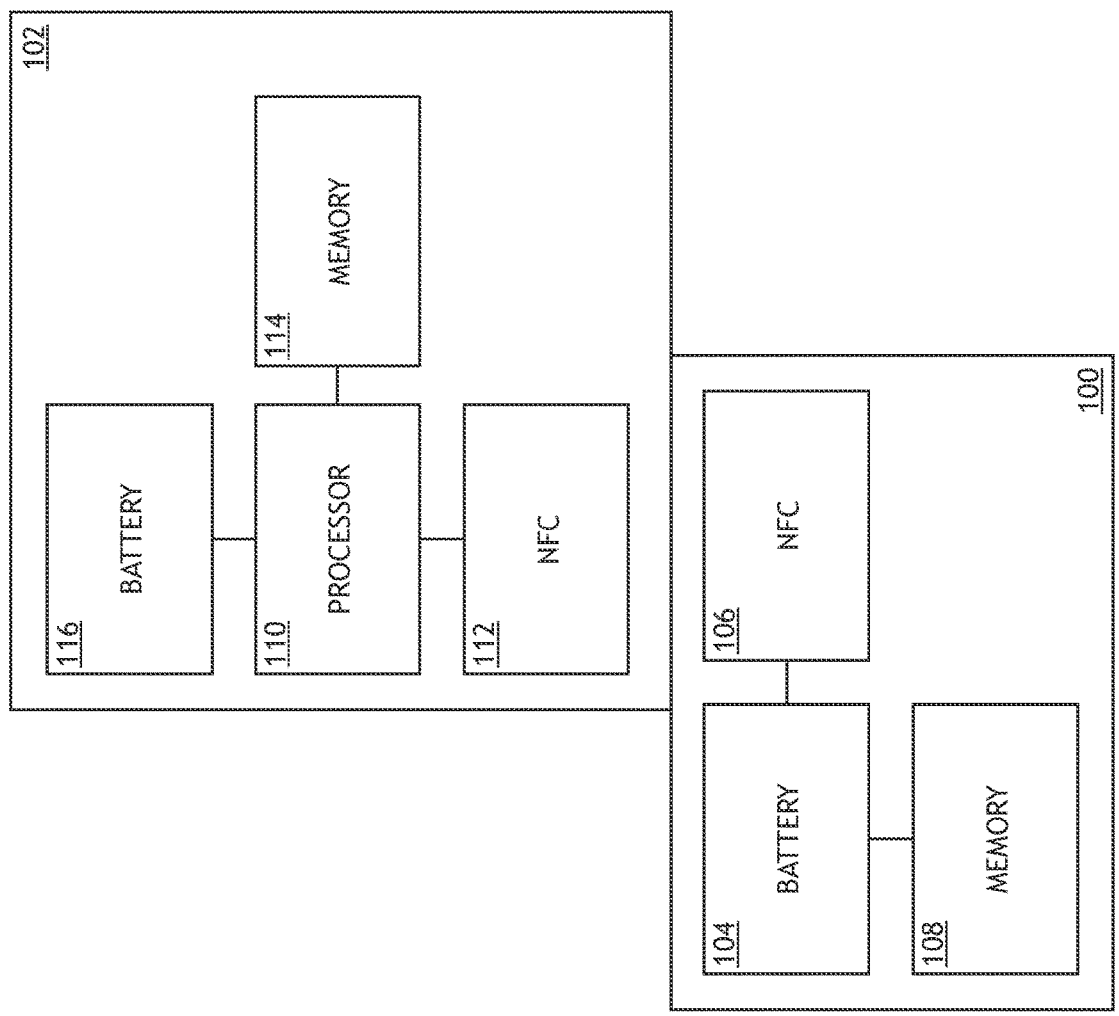
FIG. 1 shows a block diagram view of system for wireless power delivery according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a wireless power delivery system for aircraft seats. Each seat row includes an NFC power receiving device disposed at a known location proximal to floor rail bracket engaging portion of the seat. Likewise, an NFC power delivery device engages a corresponding bracket disposed underneath the aircraft floor. The brackets are aligned to each other to ensure the disposition of the NFC power delivery device is sufficiently close to the NFC power receiving device to effectively transfer power.

Referring to FIG. 1, a block diagram view of system for wireless power delivery according to an exemplary embodiment is shown. A wireless power delivery element 100 includes a processor 104, memory 108 connected to the processor 104, and an NFC device 106 configured for wireless power transmission. Likewise, a wireless power receiving element 102 includes a processor 110, memory 114 connected to the processor 110, and an NFC device 112 configured for wireless power receiving. Power may be transferred from the wireless power delivery element 100 to the wireless power receiving element 102 via inductive coupling for supply to user devices of the users in the corresponding aircraft seats. A battery 116 may be connected to the wireless power receiving processor 110 to facilitate the regular supply of power to such user devices. In at least one embodiment, the wireless power delivery processor 104 or wireless power receiving processor 110, or both, may be configured to receive signals from an external source to control delivery of power; for example, power may be made available to certain ticket class holders or as an optional amenity; in those cases, power delivery may be restricted via a central controlling processor via command signals to the wireless power delivery processor 104 or wireless power receiving processor 110, or both.

In at least one embodiment, load distribution is inconsistent between seat rows. Each wireless power delivery element processor 104 and wireless power receiving element processor 110 may be configured as a power sensor: the wireless power delivery element processor 104 may apply periodic or oscillating signals to detect any load. A centralized power distribution system may utilize the detected load data to manage each wireless power delivery element processor 104 via signals to turn the corresponding wireless power delivery element NFC device 106 on or off, including to supply power to the battery 116 during otherwise low load situations.

Frequencies utilized in aircraft are tightly controlled to prevent interference with avionics systems. In at least one embodiment, frequencies utilized by the NFC devices 106, 112 are configured to avoid interfere with aircraft operations.

NFC based wireless power transfer is only operative when the wireless power delivery NFC device 106 is properly aligned to the wireless power receiving NFC device 112. In an aircraft, such alignment is difficult because the wireless power receiving NFC device 112 may be affixed to a row of seats which can be in any of a large number of possible locations, and the main cabin is separated from the cargo area by a large nondescript floor that offers few landmarks.

Figure 2:
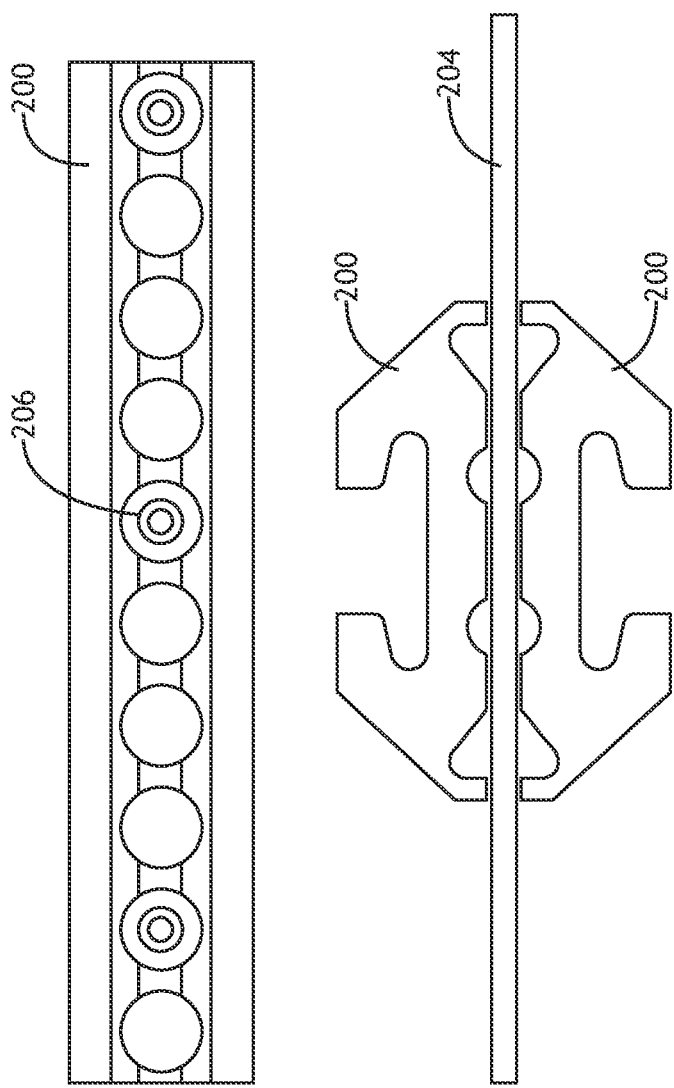
FIG. 2 shows a cross-sectional front view of brackets according to an exemplary embodiment.

Referring to FIG. 2, a cross-sectional front view of brackets 200, 202 according to an exemplary embodiment is shown. In aircraft, seat rows are often placed according to a bracket 200 disposed on the main cabin floor 204. The bracket 200 includes regularly spaced detents to define fixed locations for seat rows. Furthermore, the bracket 200 is affixed to the floor 204 at a plurality of predefined attachment locations 206 (rivet holes, screw holes, etc.) In order to align corresponding wireless power delivery elements and wireless power receiving elements, the main cabin bracket 200 may be aligned with a cargo bay bracket 202 beneath the main cabin floor 204 by aligning the predefined attachment locations 206 of each bracket 200, 202.

Figure 3:
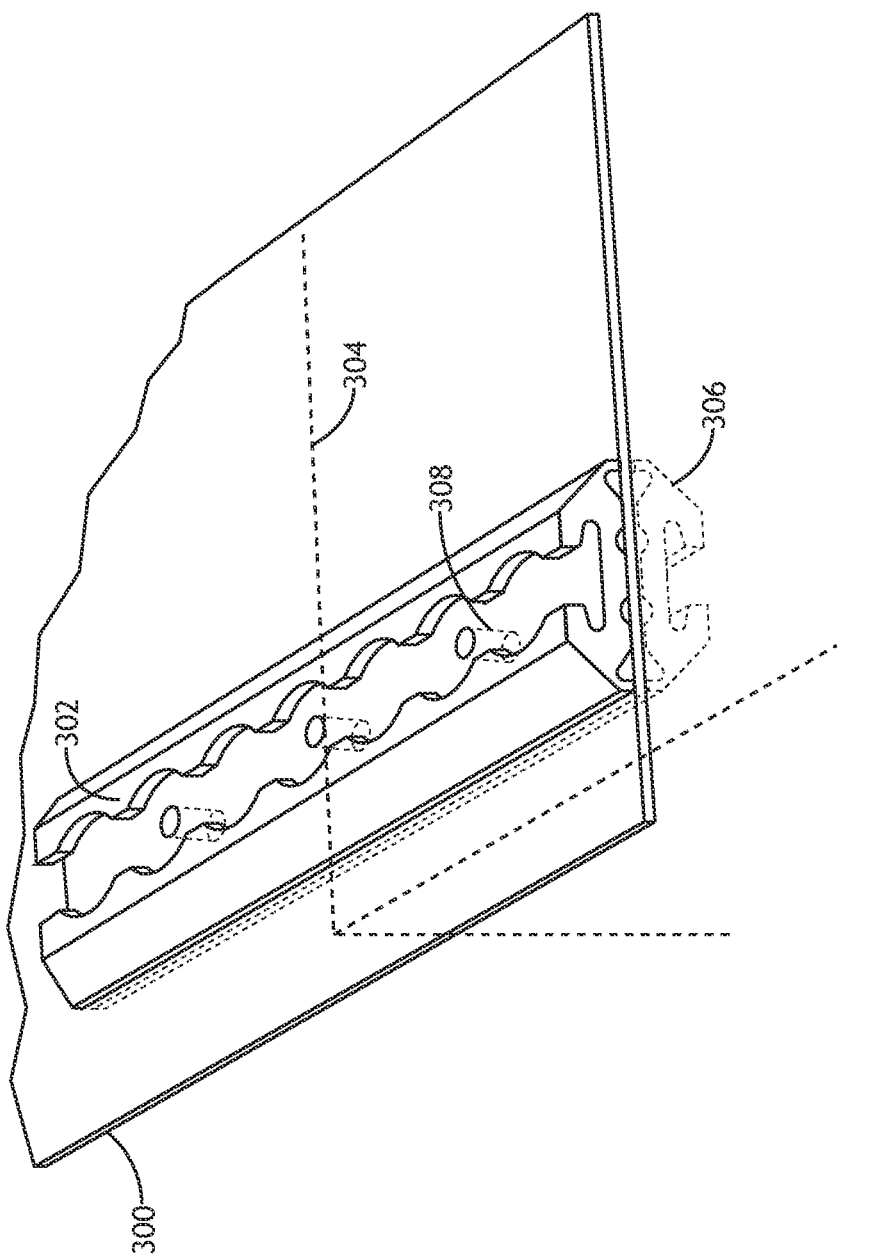
FIG. 3 shows a perspective view of a system for aligning NFC wireless power delivery devices for aircraft seats.

Referring to FIG. 3, a perspective view of a system for aligning NFC wireless power delivery devices for aircraft seats is shown. The system includes a main cabin bracket 302 disposed on the main cabin floor 300; aircraft seat rows are placed at certain predefined locations corresponding to one of a plurality of detents defined by the main cabin bracket 302. A wireless power receiving element is also disposed at a known location on each aircraft seat row to place the wireless power receiving element in very close proximity to the main cabin floor 300.

A cargo bay bracket 306 is mounted to an overhead surface of the cargo bay so that the cargo bay bracket 306 is aligned to the main cabin bracket 302. In at least one embedment, predefined attachment locations 308 in each bracket 302, 306 are aligned to each other such that the brackets 302, 306 may be affixed to the main cabin floor 300 and overhead surface respectively by a single set of attachment elements such as rivets, bolts, etc. In at least one embedment, each attachment element in the set of attachment elements may be uniquely identifiable both from the main cabin and the cargo bay so that the wireless power delivery devices and wireless power receiving devices may be aligned to each other with reference to specific attachment elements.

In at least one embodiment, the wireless power delivery devices may be disposed in or on cargo containers 304 in the cargo bay. In such embodiments, the cargo containers 304 may engage the cargo bay bracket 306.

Figure 4:
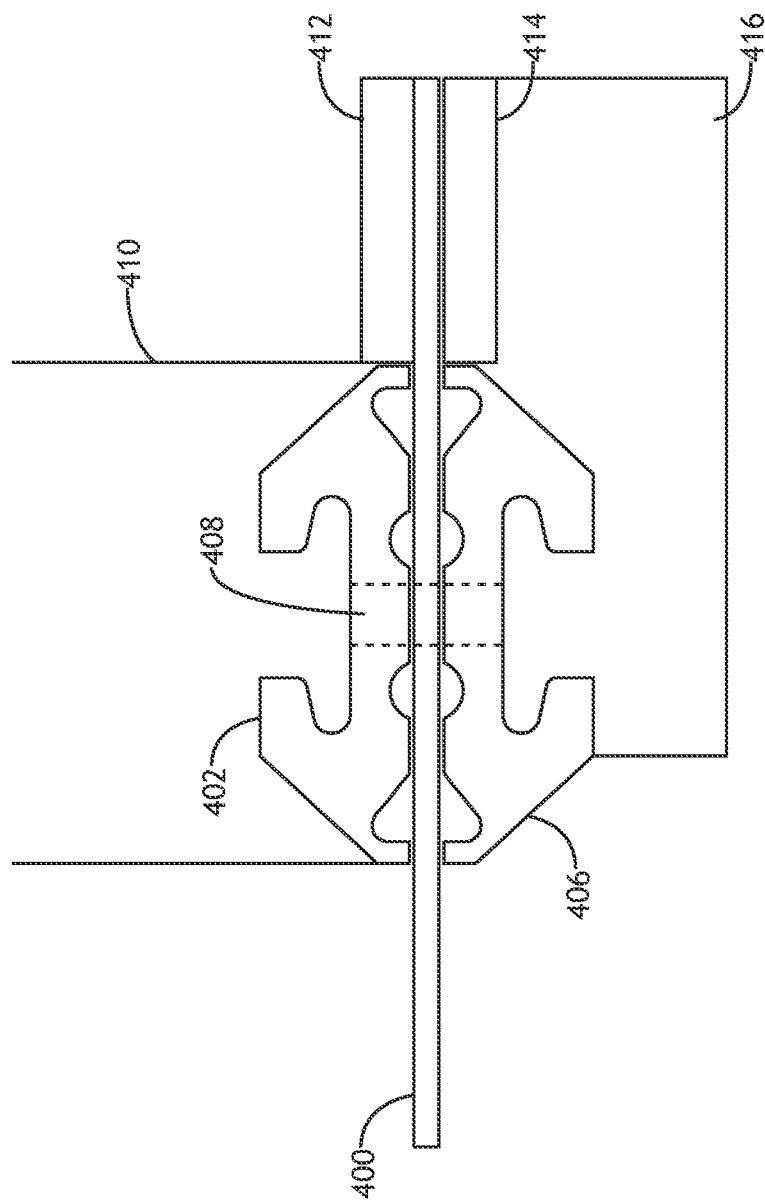
FIG. 4 shows a cross-sectional front view of brackets according to an exemplary embodiment.

Referring to FIG. 4, a cross-sectional front view of brackets 402, 406 according to an exemplary embodiment is shown. A main cabin bracket 402 disposed on the main cabin floor 400 is configured to engage aircraft seat rows 410 disposed at certain predefined locations corresponding to one of a plurality of detents defined by the main cabin bracket 402. A wireless power receiving element 412 is also disposed at a known location on each aircraft seat row 410 to place the wireless power receiving element 412 in very close proximity to the main cabin floor 400.

A cargo bay bracket 406 is mounted to an overhead surface of the cargo bay (a bottom surface of the main cabin floor 400) so that the cargo bay bracket 406 is aligned to the main cabin bracket 402. In at least one embedment, predefined attachment locations 408 in each bracket 402, 406 are aligned to each other such that the brackets 402, 406 may be affixed to the main cabin floor 400 and overhead surface respectively by a single set of attachment elements such as rivets, bolts, etc. In at least one embedment, each attachment element in the set of attachment elements may be uniquely identifiable both from the main cabin and the cargo bay so that the wireless power delivery devices 414 and wireless power receiving devices 412 may be aligned to each other with reference to specific attachment elements.

In at least one embodiment, a carriage element 416 is configured to engage the cargo bay bracket 406 and contain the wireless power delivery device 414. The carriage element 416 is configured to place the wireless power delivery device 414 at a desirable location, proximal to a corresponding wireless power receiving device 412, when the carriage element 416 is disposed at a location along the cargo bay bracket 406 defined by one of the attachment elements.

Alternatively, or in addition, each of the main cabin bracket 402 and cargo bay bracket 406 may include some unique indicia of location, such as numerical identifiers associated with each detent, such that the indicia of location are the same on both the main cabin bracket 402 and cargo bay bracket 406 when the brackets 402, 406 are properly aligned via the attachment elements.

Alternatively, the wireless power delivery device 414 and carriage element 416, including a corresponding processor, may include a physical indicator to indicate when the wireless power receiving device 412 and wireless power delivery device 414 are in sufficient proximity; for example, an LED may illuminate when inductive coupling above a certain threshold is detected.

Existing main cabin floors 400 are made of conductive materials. Embodiments of the present disclosure may utilize non-conductive composite materials for the main cabin floor 400 to prevent interference with wireless power transfer through inductive coupling. Alternatively, designated spots on the main cabin floor 400 could be non-conductive to provide for the inductive coupling.

Embodiments of the present disclosure enable inductive couplers that can be moved easily and attached to the cabin floor (roof of the cargo bay) from within the cargo bay making it easier to reconfigure the cabin, seat spacing, etc. No power wires would be contained within the cabin beyond the individual seat frames leading to much easier removal and installation of seat frames, less wire weight in the cabin as wires can be routed more directly in the roof of the cargo bay, and greater protection for the wires.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A wireless power delivery apparatus for aircraft seats comprising:
   a wireless power delivery element comprising:
      a near field communication (NFC) power delivery device; and
      at least one processor in data communication with the NFC power delivery device and a memory storing processor executable code for configuring the at least one processor to:
         supply power to the NFC power receiving device;
   a wireless power receiving element comprising:
      a NFC power receiving device; and
      at least one processor in data communication with the NFC power receiving device and a memory storing processor executable code for configuring the at least one processor to:
         receive power from the NFC power delivery device;
   a power receiving bracket; and
   a power delivery bracket,
   wherein:
      the power receiving bracket and power delivery bracket are configured to align the NFC power delivery device and NFC power receiving device on opposite sides of an aircraft floor.

2. The wireless power delivery apparatus of claim 1, wherein the power receiving bracket and power delivery bracket each define sets of attachment locations configured to allow power receiving bracket and power delivery bracket to be aligned on opposite sides of the aircraft floor.

3. The wireless power delivery apparatus of claim 1, further comprising a set of attachment elements, each configured to engage an attachment location in both the power receiving bracket and power delivery bracket.

4. The wireless power delivery apparatus of claim 3, wherein each attachment element is uniquely identifiable from both a power receiving bracket side and a power delivery bracket side.

5. The wireless power delivery apparatus of claim 1, wherein each of the power receiving bracket and power delivery bracket comprise location identifies, each uniquely corresponding to a detent, and each disposed to align with a corresponding location identifier in the opposing bracket when aligned.

6. The wireless power delivery apparatus of claim 1, wherein the at least one processor of the wireless power delivery element is further configured to:
   identify inductive coupling between the NFC power delivery device and NFC power receiving device above a threshold; and
   provide an indication of inductive coupling above the threshold.

7. The wireless power delivery apparatus of claim 1, wherein the at least one processor of the wireless power delivery element is further configured to:
   receive control signals from a central power distribution controller; and
   activate the NFC power delivery device based on the control signals.

8. The wireless power delivery apparatus of claim 7, wherein the at least one processor of the wireless power delivery element is further configured to:
   periodically test a load at the NFC power delivery device by applying an oscillating signal; and
   send a test result to the central power distribution controller.

9. A method of wireless power delivery for aircraft seats comprising:
   aligning a power receiving bracket and a power delivery bracket on opposite sides of an aircraft floor;
   installing a wireless power delivery element on the power delivery bracket at a first location, the wireless power delivery element comprising a near field communication (NFC) power delivery device and at least one processor in data communication with the NFC power delivery device and a memory storing processor executable code for configuring the at least one processor to supply power to a NFC power receiving device; and
   installing a wireless power receiving element on the power receiving bracket at a second location, the wireless power receiving element comprising a NFC power receiving device and at least one processor in data communication with the NFC power receiving device and a memory storing processor executable code for configuring the at least one processor to receive power to the NFC power delivery device,
   wherein:
      the first location and second location are configured to align the NFC power delivery device and NFC power receiving device of the power receiving bracket and power delivery bracket.

10. The method of claim 9, wherein aligning the power receiving bracket and power delivery bracket comprises aligning sets of attachment locations.

11. The method of claim 10, further comprising affixing both the power receiving bracket and power delivery bracket to opposite sides of an aircraft floor via a set of attachment elements, each configured to engage an attachment location.

12. The method of claim 10, wherein each attachment element is uniquely identifiable from both a power receiving bracket side and a power delivery bracket side.

13. The method of claim 9, wherein each of the power receiving bracket and power delivery bracket comprise location identifies, each uniquely corresponding to a detent, and each disposed to align with a corresponding location identifier in the opposing bracket when aligned.

14. A system for wireless power delivery to aircraft seats comprising:
   a wireless power delivery element comprising:

a near field communication (NFC) power delivery device; and
at least one processor in data communication with the NFC power delivery device and a memory storing processor executable code for configuring the at least one processor to:
supply power to a NFC power receiving device;
a wireless power receiving element comprising:
a NFC power receiving device; and
at least one processor in data communication with the NFC power receiving device and a memory storing processor executable code for configuring the at least one processor to:
receive power from the NFC power delivery device;
a power receiving bracket; and
a power delivery bracket,
wherein:
the power receiving bracket and power delivery bracket are configured to align the NFC power delivery device and NFC power receiving device on opposite sides of an aircraft floor.

15. The system for wireless power delivery of claim 14, wherein the power receiving bracket and power delivery bracket each define sets of attachment locations configured to allow power receiving bracket and power delivery bracket to be aligned on opposite sides of the aircraft floor.

16. The system for wireless power delivery of claim 14, further comprising a set of attachment elements, each configured to engage an attachment location in both the power receiving bracket and power delivery bracket.

17. The system for wireless power delivery of claim 16, wherein each attachment element is uniquely identifiable from both a power receiving bracket side and a power delivery bracket side.

18. The system for wireless power delivery of claim 14, wherein each of the power receiving bracket and power delivery bracket comprise location identifies, each uniquely corresponding to a detent, and each disposed to align with a corresponding location identifier in the opposing bracket when aligned.

19. The system for wireless power delivery of claim 14, wherein the at least one processor of the wireless power delivery element is further configured to:
identify inductive coupling between the (NFC) power delivery device and NFC power receiving device above a threshold; and
provide an indication of inductive coupling above the threshold.

20. The system for wireless power delivery of claim 14, further comprising a central power distribution controller configured via nontransitory processor executable code to:
identify a load at each of one or more wireless power delivery elements; and
send control signals to the one or more wireless power delivery elements according to the identified loads to control load distribution,
wherein the at least one processor of the wireless power delivery element is further configured to:
send load data to the central power distribution controller; and
receive control signals from the central power distribution controller.

\* \* \* \* \*